United States Patent

Halaby, Jr.

[15] 3,645,568
[45] Feb. 29, 1972

[54] METHOD AND APPARATUS FOR CONNECTING AND LOCKING TWO MEMBERS TOGETHER

[72] Inventor: Samuel A. Halaby, Jr., Pittsford, N.Y.
[73] Assignee: Samuel Halaby, Inc., Rochester, N.Y.
[22] Filed: July 24, 1969
[21] Appl. No.: 844,307

[52] U.S. Cl. ................................285/360, 29/428, 285/423
[51] Int. Cl. .................................................F16l 17/00
[58] Field of Search ...............285/360, 361, 376, 386, 401, 285/402, 307, 189, 18, 6, 423, 424, 81; 234/351; 29/240, 428; 205/82

[56] References Cited

UNITED STATES PATENTS

| | | | |
|---|---|---|---|
| 789,541 | 5/1905 | Hayes | 285/376 X |
| 939,211 | 11/1909 | Brown | 285/376 X |
| 1,033,187 | 7/1912 | Metzger | 285/376 X |
| 1,857,420 | 5/1932 | Wolford | 285/85 |
| 1,253,065 | 1/1918 | Looze | 285/360 X |
| 2,355,407 | 8/1944 | Wyss | 285/6 |
| 3,064,998 | 11/1962 | Syverson | 285/184 X |

Primary Examiner—Dave W. Arola
Attorney—Schovee & Boston

[57] ABSTRACT

The combination of: (1) a bayonet or other turn-type connecting mechanism for connecting two members together, and (2) a separate locking mechanism, spaced from the connecting means, and automatically put in locking engagement at a predetermined angular orientation of the two members as they are being turned to connect them together. Before rotating the two members to disconnect them, the locking mechanism must be disengaged; this is accomplished by a combination tilting and rotational movement of the two connected members.

7 Claims, 3 Drawing Figures

Patented Feb. 29, 1972

3,645,568

INVENTOR
SAMUEL A. HALABY, JR.

BY Thomson & Schouw

ATTORNEY 3,645,568

METHOD AND APPARATUS FOR CONNECTING AND LOCKING TWO MEMBERS TOGETHER

BACKGROUND OF THE INVENTION

1. Field of the Invention

This invention relates to a method and apparatus for connecting and locking two members together, and in a preferred embodiment thereof to a connector and lock means for holding together the two parts of a fluid-spraying apparatus.

2. Description of the Prior Art

It is often desirable, and sometimes necessary to not only removably *connect* two members together, but also to *lock* the two connected members together, to prevent for example, both unauthorized disconnections and accidental disconnections. It is known in the prior art to lock two members together by means of a lock screw which is separately engaged after the two members have been connected. The use of such a lock screw has the inherent disadvantages of: requiring a separate, different, and additional operation; requiring additional time to engage locking mechanism, requiring one or more tools to engage the lock, and requiring additional parts thus making the device more complex and more expensive. It is noted that the above disadvantages of prior art locks being time consuming and of requiring additional tools and additional manipulative steps come into play *during both* the connecting and disconnecting steps. Another disadvantage of the prior art lock screw is that it must be available externally of the device for operation thereof, thus making its presence known such that it cannot operate as a safety lock to prevent unlocking by unauthorized personnel.

SUMMARY OF THE INVENTION

A method and apparatus for connecting and locking two members together, the apparatus comprising the combination of a turn-type connector, including interlocking lugs and retaining flanges, and a locking means spaced from the connector, and located on facing, contacting surfaces of said members, the locking means including a projecting flange and a groove adapted to receive the flange. The two facing surfaces containing the locking means are forced toward each other by the connector such that the flange "snaps" into the groove to lock the two members against further rotation. In order to disengage the locking means, one member must be tilted with respect to the other to pull the flange out of the groove, while at the same time a rotational force must be applied between the two members to displace the flange from overlying relationship with the groove. Once the lock is disengaged, the two members can be disconnected by simply rotating one of them relative to the other.

The present invention provides a lock that: (1) is automatically engaged at the end of the connecting step; (2) requires no additional time to operate; (3) requires no tools to operate; (4) requires no operation separate from the connecting operation; (5) prevents accidental disconnections, and (6) prevents unauthorized disconnections because the lock is hidden from view and in order to operate it one must know: (1) to tilt the two members relative to each other, (2) to tilt them in a certain direction, and (3) to simultaneously apply a rotative force while tilting until the lock is disengaged. By preventing unauthorized disconnections, as described in item No. 6 above, the present invention provides a simple, inexpensive, easy (for adults) to operate, children's safety lock.

BRIEF DESCRIPTION OF THE DRAWING

The present invention will be more fully understood by reference to the following detailed description thereof, when read in conjunction with the attached drawings, wherein like reference numerals refer to like elements and in which.

DETAILED DESCRIPTION OF THE PREFERRED EMBODIMENT

Figure 2:
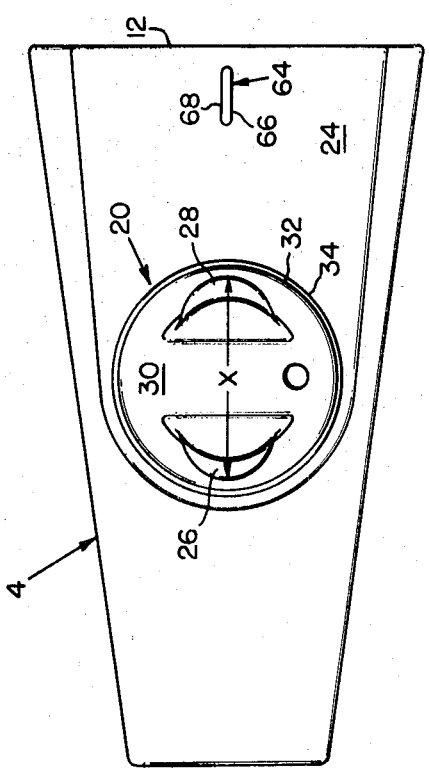
FIG. 2 is a bottom plan view of the top member showing the lugs of the connector and the flange of the lock.

The present invention will now be described with reference to the attached drawing and with respect to the preferred embodiment of the invention wherein a connector 8 and a lock 10 are used on a fluid sprayer apparatus 2, the operation of which is similar to that described in U.S. Pat. No. 3,136,487, issued June 9, 1964. The fluid sprayer 2 is used for spraying atomized fluid such as an insecticide.

The fluid-spraying apparatus 2 is preferably made in two separate parts of molded polyethylene; the two parts comprising a sprayer housing 4 and a fluid container 6. The housing 4 and container 6 are firmly connected together during spraying operations but must be disconnected thereafter for adding additional fluid to the container, and for servicing and cleaning, for example. The housing 4 and container 6 are held together according to the present invention by means of a connector 8 and a lock 10.

The mechanical operation of the sprayer 2 itself forms no part of the present invention and need not be described here; reference can be had to my above identified patent for a description thereof. However, a brief description of the operation of the sprayer 2 may be useful.

Air is sucked into housing 4 through holes in the rear end 12 and is blown out of housing 4 through an opening in front end 14 by means of a motor driven fan (not shown) in the housing 4; the motor is controlled by a switch 16. Fluid contained in the container 6 flows up through a tube 18 and atomized fluid is blown out of a nozzle (not shown) connected to tube 18 and located in the opening in the front end 14, by aspirating action.

The connector 8 of the present invention is of the bayonet or turn type of connector and comprises a male portion 20 and a mating female portion 22. The male portion 20 is formed on a bottom wall surface 24 of housing 4 and includes a pair of lugs 26 and 28, extending downwardly from a flat lug supporting surface 30.

The surface 30 can be considered as being a circular island raised up off of the surface 24. A circular groove 32 is formed in the wall connecting the surface 30 and the surface 24, and an O-ring 34, preferably made of neoprene, is positioned in groove 32, the purpose of which is to seal the container 6 closed to prevent any liquid therein from spilling out, if the sprayer 2 is accidentally knocked over, for example. The O-ring 34 also functions to provide a close, tight connection between housing 4 and container 6, by resiliently taking up any looseness or play between the two members.

Arcuate grooves 36 and 38 are formed between the surface 30 and the lugs 26 and 28 respectively, for receiving retaining flanges 60 and 62, of the female portion 22 of the connector 8, to be described below.

The female portion 22 of the connector 8 is formed in a top surface 40 of the container 6. The female portion comprises an opening 42 in a flat bottom wall 44 of a circular recess 46. The bottom wall 44 is flat and substantially parallel to the top surface 40. Sidewall 48 of the recess is in the shape of a portion of an inverted cone and taper from a large diameter at the top surface 40 to a smaller diameter at the bottom wall 44. A circular groove 50, adapted to receive the O-ring 34 is formed where sidewall 48 meets the top surface 40.

Figure 3:
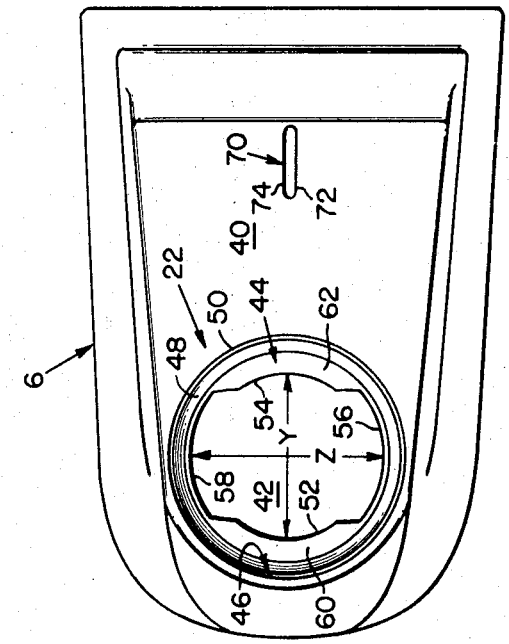
FIG. 3 is a top plan view of the bottom member showing the retaining flanges of the connector and the groove of the lock.

The opening 42 has the shape of an irregular circular opening defined partly by the arcuate edges of walls 52 and 54, between which the opening 42 has a diameter Y, and also partly defined by the arcuate edges of a pair of oppositely disposed cutout portions 56 and 58, between which the opening has a larger diameter Z. This construction of the female portion 22 defines a pair of oppositely spaced, lug-retaining flanges 60 and 62. The distance X shown in FIG. 2 is the maximum distance separating the outer edges of lugs 26 and 28, and is greater than the distance Y shown in FIG. 3, but less than the distance Z shown in FIG. 3, whereby the lugs 26 and 28 of the male portion 20, when properly angularly oriented in the opening 42, can pass below the cutout portions 56 and 58.

The operation of the connector 8 is as follows:

The container 6 is held in the left hand, for example, and the housing 4 is held in the right hand, by a handle 63. The lugs 26 and 28 are then aligned with the cutout portions 56 and 58 and the two members 4 and 6 of the sprayer 2 are then pushed together and rotated relative to one another. In this way the retaining flanges 60 and 62 are driven into the grooves 36 and 38. This action forces the housing 4 and the container 6 close together forcing the O-ring 34 into seating engagement with the groove 50 to provide a very tight seal and connection between the two members of the sprayer apparatus 2. A small bleeder hole can be provided in the top of container 6 to allow air to enter therein during operation, to prevent drawing a vacuum in the container 6.

The locking mechanism 10 of the present invention which operates uniquely with the above-described connector 8 will now be described.

The locking mechanism 10 comprises a downwardly extending flange 64 attached to the bottom surface 24 of the housing 4. The flange is spaced radially from the male portion 20 of the connector 8 and the flange 64 is oriented with its length along a radial line extending from the center of the male portion 20 to the flange 64, so as to provide vertical sidewalls 66 and 68. The top surface 40 of the container 6 is provided with an elongated groove 70 having a length, width, and depth adapted to accommodate the flange 64. The groove 70 has vertical sidewalls 72 and 74; the sidewalls 72 and 74 cooperate with vertical walls 66 and 68, respectively, of the flange 64 to positively prevent relative rotation of housing 4 and container 6 after the flange 64 snaps into the groove 70. The groove 70 is spaced from the female portion 22 of the connector 8 and the length of the groove is oriented along a radial line extending from the female portion 22 to the groove 70. The groove 70 is located and oriented such that the flange 64 and groove 70 will come into mating engagement at a particular angular orientation of the housing 4 and container 6. When the housing 4 is rotated relative with the container 6 and the flange 64 reaches a point over the groove 70, the flange 64 snaps into groove 70 to lock the two portions 4 and 6 of the spraying apparatus 2 against further relative rotational movement.

The housing 4 and the container 6 are thus connected and locked. In order to disconnect the housing 4 from the container 6 it is necessary to first disengage the lock 10 and then rotate the two members 4 and 6 relative to each other to disconnect the connector 8. Because the lock 10 prevents relative rotational movement between members 4 and 6, the apparatus shown in the drawing is constructed in such a way as to allow sufficient tilting of the housing 4 away from container 6 to pull flange 64 out of groove 70. The members are "tilted" in that they move apart at the lock 10 but remain in contact at the connector 8. The lock 10 is disengaged by tilting one of members 4 and 6 relative to the other, i.e., by lifting the rear end of the housing 4 up away from the container 6, while at the same time applying a rotative force between the two members 4 and 6 so that as soon as the bottom of flange 64 clears the surface 24, the housing 4 will rotate relative to container 6. The housing 4 can be disconnected from container 6 by simply continuing to apply the rotative force to turn one member relative to the other until lugs 26 and 28 reach cutout portions 56 and 58.

The present invention has been described above with respect to the preferred embodiment thereof, however, it is to be understood that the connector and lock of the present invention can be used to connect and lock together various types of members. For example, it is not necessary that both members be hollow as in the preferred embodiment. One or both of the members can be solid. It is only necessary that there by a sufficient distance below the retaining flanges 58 and 60 to accommodate the lugs 24 and 26. The present invention is useful whenever two members are to be connected and locked. The two members can be, for example, a picture and a wall, whereby the picture can be attached to the wall and locked against being accidentally moved (for example to a crooked orientation), or knocked down off of the wall. The combination connector and lock can be formed as a unit on a support plate, (such as surfaces 24 and 40 in the Figures). A pair of mating units can be provided and one support plate connected (by glue, screws, etc.) to one member and the other unit connected to the other of the two members to be connected. One of the units can be only partly secured to a member until the desired angular orientation of the members, when connected, is determined and then the unit can be securely attached to the member. Once this is accomplished, every time the two members are connected they will automatically be locked in the desired angular orientation. The picture is also prevented from being removed by unauthorized personnel by the fact that the lock is hidden from view and one must know in which direction to tilt the two members in order to unsnap or disengage the lock. The safety feature is important in applications where the connector and lock of the present invention is used to connect and lock a lid or cap on a container of medicine, poison, or other dangerous materials, for example. The chances that a child could open a lid on a container of poison, gasoline, etc., wherein the lid and container are connected and locked according to the present invention, are very small. The connector and lock unit of the present invention provides an infinitely greater safety factor than the simple screw lid now so widely used; and the unit of the present invention is nearly as fast and simple to use (for adults), and as economical to make as is the screw lid. Further, the lug and the retaining ring can be manufactured to fit together so tight that a child would be incapable of turning the two members to disconnect them. Similarly, for added safety, the fit between the two connected members can be sufficiently close and the flange sufficiently wide (projecting sufficiently far) to require an adults' strength to tilt the members far enough to unlock the lock. Further, it is noted that the flange 64 of the lock 10, (the male portion of the lock 10), need not be on the same member as that having the male portion 20 of the connector 8; but one of the members 4 and 6 can have the male portion of the connector 8 and the female portion of the lock 10.

The lock of the present invention prevents unlocking by anyone who is not aware of the existence of the lock. Particularly unique features of the present invention are that the locking means is engaged and disengaged while the hands remain in the *same position* they occupy for connecting and disconnecting the two members, that the locking and unlocking takes no more time than is consumed by the connecting and disconnecting, that the lock is hidden and is therefore a safety lock, and that the lock can be molded along with the connector with little if any additional cost.

Figure 1:
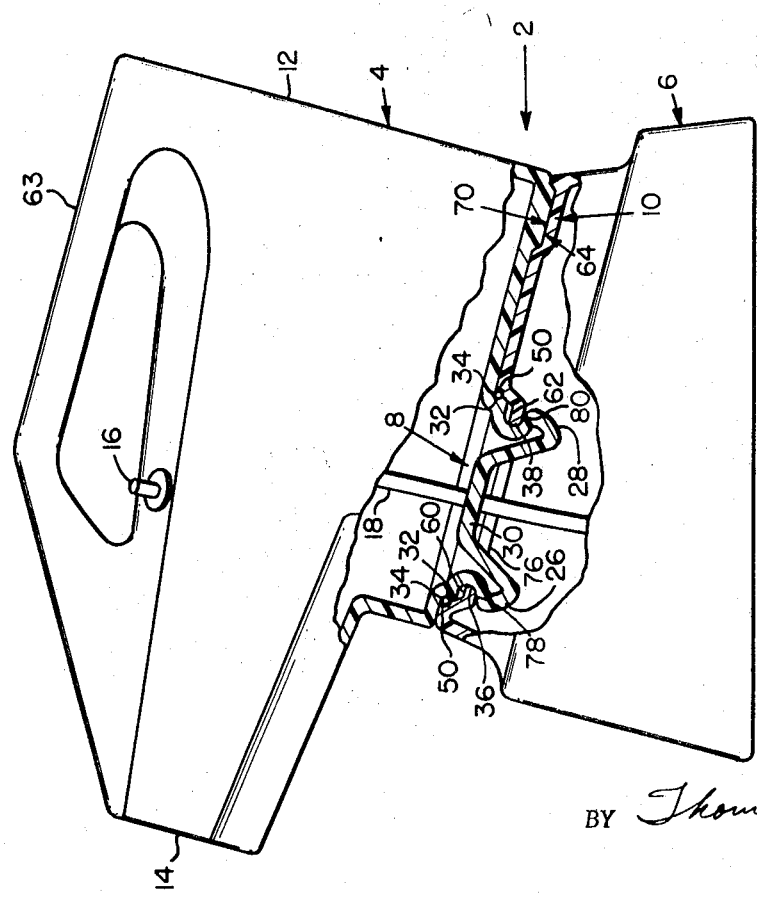
FIG. 1 is a partly broken away side view of a two-part fluid spraying apparatus showing the connector and lock of the present invention.

Another advantage of the present invention as shown in FIG. 1 is that since the two facing surfaces 24 and 40 are at an angle, the nozzle can be directed at any one of a variety of angles by merely stopping the rotational positioning of the connector at the desired point. A plurality of locking means located at various angular points can be employed is desired. However, the connection made by the connector is quite tight and is sufficient by itself to hold the housing at any desired angle.

Another aspect of the present invention concerns certain relative axial dimensions of the male portion 20 and the female portion 22 of the bayonet connector 8. By making the distance between (1) the top surface 40 of the container 6 and a bottom surface 76 of the lug-retaining flanges 60 and 62 somewhat greater than (2) the distance between the bottom surface 24 of the housing 4 and bottom surfaces 78 and 80 of the grooves 36 and 28 respectively, a very tight connection can be made. This tight connection is made possible by a virtue of the flexible properties of the material of the coupling portions 20 and 22, which material is preferably a relatively rigid plastic having sufficient flexibility to permit the sidewall 48 and the lug-retaining flanges 60 and 62 to bend upwardly slightly, under the compressive pressure applied thereto. As the two members 4 and 6 are rotated relative to each other the female portion 22 of the connector 8 is forced between surface 24 and the surfaces 78 and 80 of the male portion. Although one of the portions 20 and 22 can be rigid such that the other must do all of the bending, it is preferred that both portions bend, i.e., the lugs 26 and 28 can bend downwardly slightly at the same time that the above mentioned portions bend upwardly. The surfaces 24 and 40, which are forced together as the two members 4 and 6 are connected together should have mating, complementary shapes to provide a tight seal, whereby all O-rings, etc., can be eliminated. The surfaces 24 and 40 can be flat, curved, or conical, for example, or they can include a combination of such shapes; the primary requirement being that the surfaces that are forced together during connection of the two members, mate with each other. This aspect of the invention relates to bayonet connections comprising a male and a female portion wherein a first part (e.g. between surfaces 40 and 76) of the male portion is adapted to receive and to exert a compressive force on a second part (e.g. between surfaces 40, and 78 and 80) of the female portion, wherein the squeezed portion is oversized, and wherein the material of at least one of the male and female portions 20 and 22 is made flexible such that the second part can be squeezed into and received within the first part to connect the two portions.

I claim:

1. Fluid sprayer apparatus comprising:
    a housing member having a first surface;
    a container member having a second surface and adapted to be connected to said housing member, with said surfaces in facing contact with each other;
    mating, turn-type connector means on respective ones of said surfaces and adapted to connect said housing member to said container member by rotative interengagement of said connector means;
    locking means on respective ones of said surfaces for locking said housing member and said container member in a predetermined rotational orientation with respect to each other, when they are connected together, against relative rotational movement, said locking means being fixed against movement relative to said respective ones of said surfaces;
    said locking means being spaced from said connector means and including a male element on one of said surfaces and a mating female element on the other of said surfaces;
    said male element being an elongated flange having its length aligned with a straight line connecting said connector means and said locking means;
    said female element being an elongated groove adapted to receive said flange; and
    said flange and groove, when interengaged, positively locking said members against relative rotation.

2. In an apparatus for connecting together a pair of members having mating, turn-type connector means on respective contacting surfaces of said members, the improvement comprising:
    locking means comprising engageable locking elements on respective ones of said surfaces for locking said members in a predetermined rotational orientation, said locking elements adapted to become engaged preventing relative rotational movement between said members, said locking elements being fixed against movement relative to said respective ones of said surfaces;
    said locking elements comprising:
    an elongated flange projecting from one of said surfaces, the length of said flange extending in the direction of a straight line connecting said connector means and said flange, and
    an elongated groove in the other of said surfaces adapted to receive said flange.

3. The method of attaching and unattaching two members having mating, turn-type interengageable connector means on respective surfaces adapted to be placed in abutting, facing contact, and mating lock means spaced from the connector means comprising the steps of:
    simultaneously connecting and locking said members by relative rotational movement therebetween with said respective surfaces in abutting facing contact,
    unlocking said members by tilting one of said members relative to the other and by simultaneously applying a rotative force therebetween to disengage the lock means, and
    disconnecting said members by continuing to apply said rotative force.

4. Fluid sprayer apparatus comprising:
    a housing member having a first surface;
    a container member having a second surface and adapted to be connected to said housing member, with said surfaces in facing contact with each other;
    mating, turn-type connector means on respective ones of said surfaces and adapted to connect said housing member to said container member by rotative interengagement of said connector means; and
    locking means on respective ones of said surfaces for locking said housing member and said container member, when they are connected together, against relative rotational movement, and wherein said connector means includes means for forcing said surfaces toward each other, and including means for tilting one of said members relative to the other for disengaging said locking means.

5. Fluid sprayer apparatus comprising:
    a housing member having a first surface;
    a container member having a second surface and adapted to be connected to said housing member, with said surfaces in facing contact with each other;
    mating, turn-type connector means on respective ones of said surfaces and adapted to connect said housing member to said container member by rotative interengagement of said connector means;
    locking means on respective ones of said surfaces for locking said housing member and said container member, when they are connected together, against relative rotational movement;
    said connector means including a male portion connected to said housing members and comprising a pair of downwardly depending lugs and a female portion on said container member and comprising an irregularly shaped circular opening partly defined by a pair of lug-retaining flanges, and wherein said locking means includes mating male and female elements; and
    a circular groove on said male portion surrounding said pair of lugs and an O-ring position in said groove; and wherein said circular opening is recessed below said second surface and including a downwardly converging wall forming the side of said recess, whereby said O-ring is adapted to contact said wall to effectuate a tight seal between said housing member and said container member.

6. Connecting and locking means comprising a pair of surfaces having mating turn-type connector means for holding said surfaces in contact and for preventing relative axial movement between said surfaces, and said surfaces having mating, interengaging locking means, spaced from said connector means, for preventing relative rotational movement between said surfaces, and including means for disengaging said locking means comprising means for tilting one of said members relative to the other.

7. A method for connecting and locking two members together and for unlocking and disconnecting said two members comprising the steps of:
    providing said members with respective mating, male and female turn-type connecting means on respective surfaces adapted to be placed in abutting, facing, contact,
    providing said members with respective mating, male and female lock means spaced from the connecting means, rotating said members in interengagement with each other and with said surfaces in abutting facing contact to simultaneously connect and lock them together, and to unlock said members;
simultaneously:
tilting one of said members relative to the other, and
applying a rotative force between said members, such that said lock means is disengaged, and
rotating said members relative to each other to disconnect them.

* * * * *